(12) United States Patent
Scheggi

(10) Patent No.: US 10,745,032 B2
(45) Date of Patent: Aug. 18, 2020

(54) ADAS SYSTEMS USING HAPTIC STIMULI PRODUCED BY WEARABLE DEVICES

(71) Applicant: Ambarella International LP, Santa Clara, CA (US)

(72) Inventor: Stefano Scheggi, Parma (IT)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/382,486

(22) Filed: Apr. 12, 2019

(65) Prior Publication Data

US 2020/0001895 A1 Jan. 2, 2020

(51) Int. Cl.
*H04B 3/36* (2006.01)
*B60W 50/16* (2020.01)
*G06F 3/01* (2006.01)

(52) U.S. Cl.
CPC ............ *B60W 50/16* (2013.01); *G06F 3/016* (2013.01); *B60K 2370/158* (2019.05)

(58) Field of Classification Search
CPC . B60W 50/16; B60W 50/14; B60K 2370/158; B60K 2370/193; G06F 3/016; G08B 6/00
See application file for complete search history.

(56) References Cited

U.S. PATENT DOCUMENTS

| 9,744,905 | B1 * | 8/2017 | Assam | B60K 31/18 |
| 2015/0246639 | A1 * | 9/2015 | Nagata | B60Q 9/008 |
| | | | | 340/435 |
| 2016/0207454 | A1 * | 7/2016 | Cuddihy | B60Q 9/00 |
| 2016/0358453 | A1 * | 12/2016 | Wassef | G08B 25/016 |
| 2017/0123503 | A1 | 5/2017 | Szczerba | |
| 2017/0291542 | A1 | 10/2017 | Dakroub | |

FOREIGN PATENT DOCUMENTS

| DE | 102016209501 | | 12/2016 | ............ B60W 9/00 |
| GB | 2550267 A | * | 11/2017 | ............ B60Q 9/00 |

* cited by examiner

*Primary Examiner* — Toan N Pham
(74) *Attorney, Agent, or Firm* — Christopher P. Maiorana, PC

(57) ABSTRACT

The invention concerns a system comprising a processor and a device. The processor may be configured to (i) analyze one or more vehicle systems and (ii) generate a first output signal and a second output signal corresponding to the vehicle systems. The device may be configured to (i) receive the second output signal and (ii) generate haptic feedback based on the second output signal. The first output signal is presented to enable feedback using a primary feedback device. The device may be worn by a user. The haptic feedback supports information provided by the primary feedback device. The second output signal is communicated to the device using wireless communication.

20 Claims, 11 Drawing Sheets

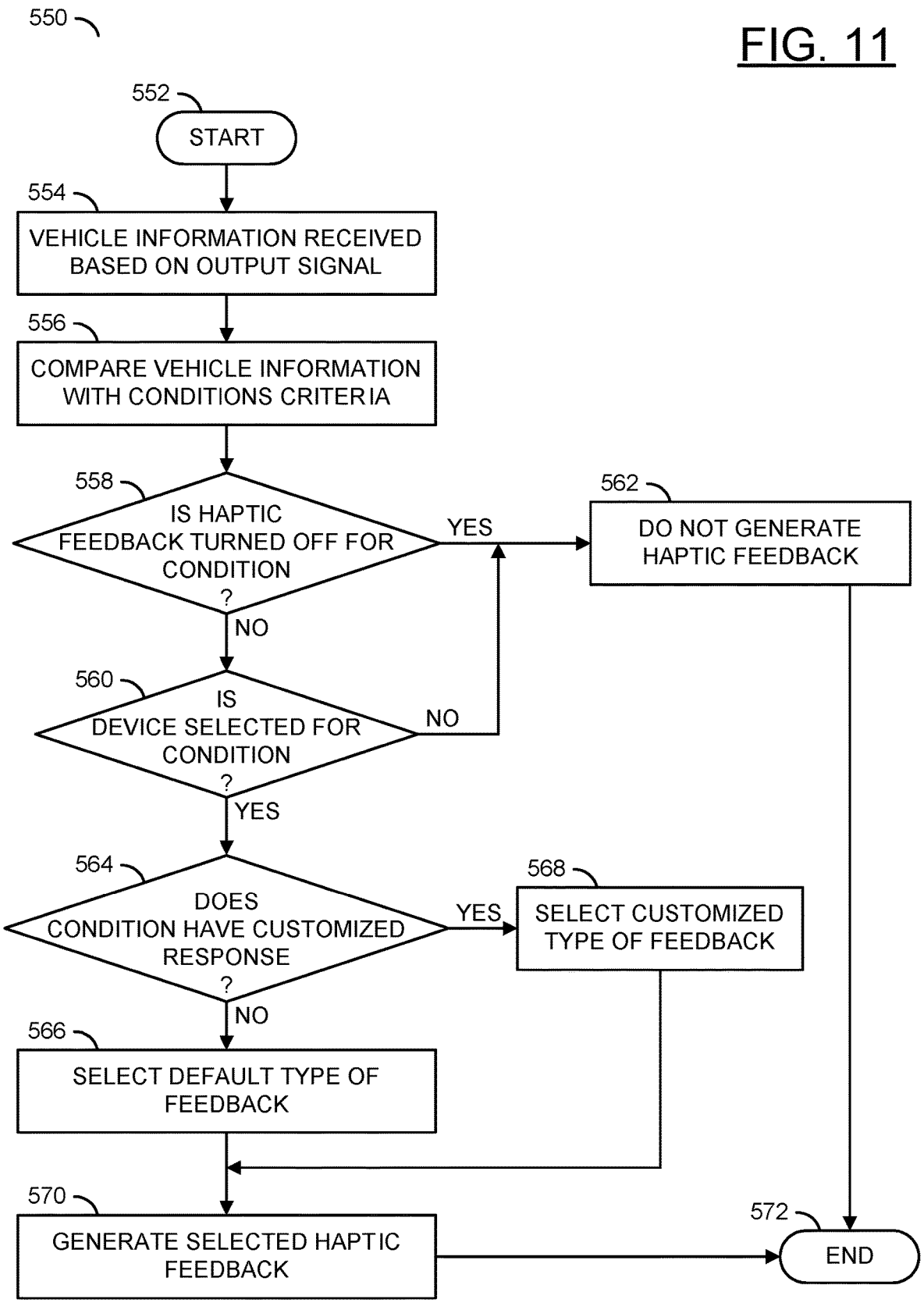

US 10,745,032 B2

ADAS SYSTEMS USING HAPTIC STIMULI PRODUCED BY WEARABLE DEVICES

This application relates to Italian Application No. 102018000006843, filed Jul. 2, 2018, which is hereby incorporated by reference in its entirety.

FIELD OF THE INVENTION

The invention relates to automotive systems generally and, more particularly, to a method and/or apparatus for ADAS systems using haptic stimuli produced by wearable devices.

BACKGROUND

Automotive systems sometimes use a screen, meters, gauges or lights on the dashboard area of an automobile to alert a driver. Such notifications are very often useful, but sometimes distract a driver from giving full attention to driving the automobile. Screens, meters and lights can provide visual messages with rich sets of information such as road conditions, a condition of the vehicle, a status of particular components of the vehicle, etc. However, to understand the information provided, the driver has to look away from the road. Some vehicles offer touchscreen displays with various interfaces that provide information, which leads to further driver distraction. Furthermore, passengers in the vehicle do not have an easy way to view the information.

It would be desirable to implement ADAS systems using haptic stimuli produced by wearable devices.

SUMMARY

The invention concerns a system comprising a processor and a device. The processor may be configured to (i) analyze one or more vehicle systems and (ii) generate a first output signal and a second output signal corresponding to the vehicle systems. The device may be configured to (i) receive the second output signal and (ii) generate haptic feedback based on the second output signal. The first output signal is presented to enable feedback using a primary feedback device. The device may be worn by a user. The haptic feedback supports information provided by the primary feedback device. The second output signal is communicated to the device using wireless communication.

BRIEF DESCRIPTION OF THE FIGURES

Embodiments of the invention will be apparent from the following detailed description and the appended claims and drawings in which:

FIG. 11 is a flow diagram illustrating a method for associating a type of feedback with vehicle information based on feedback settings.

DETAILED DESCRIPTION OF THE EMBODIMENTS

Embodiments of the present invention include providing a system that may (i) be implemented as part of an ADAS system, (ii) use haptic stimuli produced by a wearable device, (iii) provide customizable feedback, (iv) be vehicle neutral, (v) provide feedback to multiple passengers of a vehicle, (vi) supplement primary feedback systems, (vii) reduce driver distraction and/or (viii) be implemented as part of a vehicle infotainment system.

Figure 1:
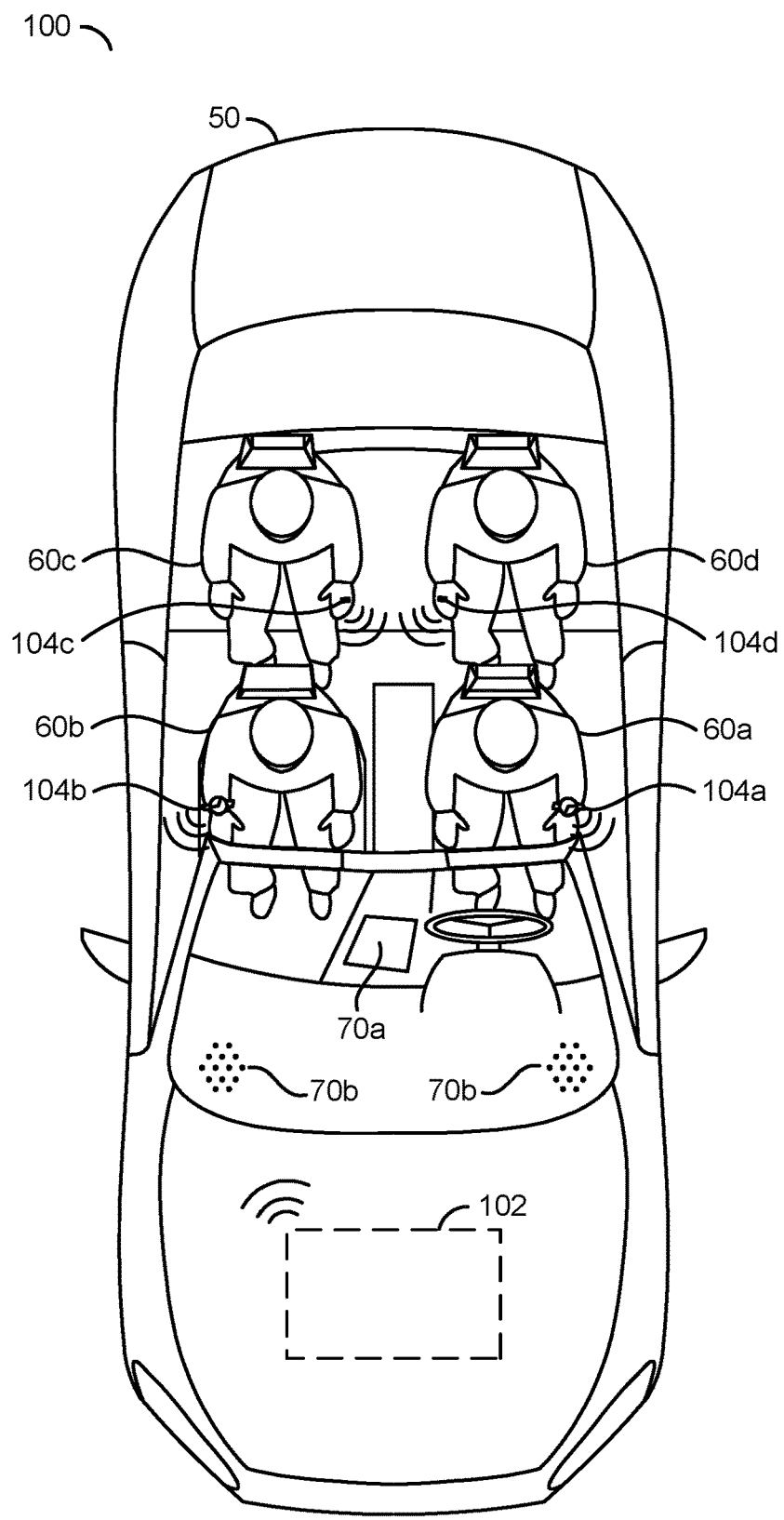
FIG. 1 is a diagram illustrating an example embodiment of the present invention.

Referring to FIG. 1, a block diagram of a system 100 is shown in accordance with an embodiment of the invention. The system 100 is shown implemented in the context of a vehicle 50. In the example shown, the vehicle 50 may be a passenger car (e.g., a sedan). In some embodiments, the vehicle 50 may be a motorcycle, a truck, a van, a delivery vehicle, a commercial vehicle, a train, a plane, etc. The type of vehicle 50 may be varied according to the design criteria of a particular implementation.

The vehicle 50 is shown having a number of passengers 60a-60d. In the example shown, the passenger 60a may be a driver. The vehicle 50 is shown having a display 70a and speakers 70b. The vehicle 50 is shown comprising a block (or circuit) 102. The circuit 102 may implement a computing device. For example, the computing device 102 may be an Advanced Driver-Assistance System (ADAS). Each of the passengers 60a-60d is shown having respective wearable devices 104a-104d. The computing device 102 and/or the wearable devices 104a-104d are shown communicating wirelessly. In the example shown, each of the passengers 60a-60d are shown wearing one of the wearable devices 104a-104d. However, in some embodiments of the system 100, one or more of the passengers 60a-60d may not wear one of the wearable devices 104a-104d and/or one or more of the passengers 60a-60d may wear more than one of the wearable devices 104a-104n (e.g., not shown).

In the example shown, the display 70a may be an infotainment system (e.g., a screen with a touchscreen display). The display 70a is shown on the dashboard of the vehicle 50. The display 70a may implement a primary feedback device for the vehicle 50. In the example shown, the speakers 70b are shown as a stereo pair of speakers. In some embodiments, the speakers 70b may be implemented as surround speakers located throughout the vehicle 50. The speakers 70b may implement a primary feedback device for the vehicle 50. In some embodiments, the primary feedback device for the vehicle 50 may further comprise dashboard lights. The types of primary feedback devices implemented by the vehicle 50 may be varied according to the design criteria of a particular implementation.

The primary feedback devices (e.g., the display 70a, the speakers 70b, dashboard lights, etc.) may be a system used to communicate information to the passengers 60a-60d. For example, the primary feedback devices may provide messages and/or warnings (e.g., lane departure, object in blind spot, GPS navigation cues, etc.). The primary feedback devices may further comprise meters and/or gauges. For example, the primary feedback devices may implement a speedometer, a tachometer, a fuel gauge, a temperature gauge, etc. The type of information provided by the primary feedback devices may be varied according to the design criteria of a particular implementation.

Generally, the primary feedback devices are configured to provide information to the driver 60*a*. For example, the speedometer may provide the current speed of the vehicle 50 to the driver. Passengers may have some difficulty viewing the primary feedback (e.g., the passengers 60*c*-60*d* may have an obstructed view, the front passenger 60*b* may have a view of the speedometer with a parallax effect, etc.). Often, the driver 60*a* may need to look away from the road to read and/or understand the information provided by the primary feedback devices. For example, the driver 60*a* may have to look down at the dashboard to view a check engine light, or look at the display 70*a* to read a map. The primary feedback devices may cause some amount of distraction (e.g., visual distraction) to the driver 60*a*.

The computing device 102 may be configured to automate, adapt and/or enhance systems of the vehicle 50 to reduce a likelihood of driver error and/or to provide feedback that may facilitate better driving. The ADAS computing device 102 may be configured to analyze input from various vehicle systems (e.g., sensors) and/or generate output that may alert the driver 60*a* of potential problems. In an example, the potential problem may be a collision. In another example, the potential problem may be a malfunctioning component of the vehicle 50. Generally, the ADAS computing device 102 may be configured to implement safeguards to help avoid collisions and/or provide a rich set of data about the vehicle 50. The types of problems and/or information analyzed and/or detected by the ADAS computing device 102 may be varied according to the design criteria of a particular implementation.

In some embodiments, the computing device 102 may be configured to provide a primary output signal. The primary output signal may be used to generate an alert (e.g., a visual notification such as a warning light, an audio notification, etc.). In one example, the alert initiated by the computing device 102 may be communicated using the primary feedback devices (e.g., the display 70*a*, the speakers 70*b*, warning lights, gauges, etc.). The computing device 102 may be further configured to generate a secondary output. The secondary output may be used to support and/or supplement the primary output. The secondary output may be presented to the wearable computing devices 104*a*-104*n*.

In some embodiments, the ADAS computing device 102 may be configured to take over control of the vehicle systems of the vehicle 50 (e.g., an anti-lock braking system, adaptive steering, automatic parking, autonomous driving, stability control, automatic braking, etc.). In some embodiments, the ADAS computing device 102 may be configured to perform measurements of vehicle systems and provide output that may be used to generate alerts and/or warnings (e.g., a seatbelt warning light, a check engine light, a lane departure warning, a collision warning, traffic warnings, GPS/navigation alerts, blind-spot alerts, etc.).

The ADAS computing device 102 may comprise features that are built into the vehicle 50. The ADAS computing device 102 may comprise features that are added as an after-market product. In the example shown in FIG. 1, a single computing device 102 is shown for clarity. However, many ADAS computing devices 102 may be implemented as part of the vehicle 50. For example, each ADAS computing device 102 may be configured to operate with a particular vehicle system. One or more ADAS computing devices 102 may be configured to implement one or more features such as: adaptive cruise control, glare-free high beam, adaptive light control (e.g., swiveling curve lights), anti-lock braking system, automatic parking, automotive navigation system, automotive night vision, blind spot monitor, collision avoidance system (pre-crash system), crosswind stabilization, cruise control, driver drowsiness detection, electronic stability control, emergency brake assist, emergency driver assistant, forward collision warning, intersection assistant, hill descent control, intelligent speed adaptation, lane departure warning system, lane change assistance, parking sensor, pedestrian protection system, rain sensor, start-stop system, omniview technology, tire-pressure monitoring system, traffic-sign recognition, turning assistant, vehicular communication systems, wrong-way driving warning, etc. The types of features provided by the ADAS computing devices 102 may be varied according to the design criteria of a particular implementation.

The ADAS computing device 102 may receive inputs from one or more data sources (e.g., the vehicle systems). The ADAS computing device 102 may be configured to receive data using the controller area network (CAN) bus of the vehicle 50. For example, the vehicle systems of the vehicle 50 may comprise various imaging sensors such as LIDAR, radar, sonar, ultra-sonic, infrared, image processing and/or computer vision. In another example, the vehicle 50 may comprise physical sensors such as accelerometers, temperature sensors, magnetometer, gyroscopes, GPS/GNSS sensors, pressure sensors, etc. In yet another example, the ADAS computing device 102 may monitor the status of user inputs (e.g., an activation of a turn signal, an angle of a steering wheel, a seat position and/or angle, information available from the on-board diagnostics (OBD) port, etc.). In some embodiments, the ADAS computing device 102 may receive inputs from sources separate from the vehicle 50 such as vehicle-to-vehicle (V2V), vehicle-to-infrastructure (V2I), cellular technology (3G/4G/5G/LTE) and/or Wi-Fi communications. The sources of data and/or types of data received by the ADAS computing device 102 may be varied according to the design criteria of a particular implementation.

The wearable devices 104*a*-104*n* may be configured to receive an output signal from the ADAS computing device 102. The wearable devices 104*a*-104*n* may be configured to generate feedback in response to the output signals from the ADAS computing device 102. In one example, the feedback generated by the wearable devices 104*a*-104*n* may be haptic stimuli. The feedback generated by the wearable devices 104*a*-104*n* may be used to support and/or supplement the information provided by the primary feedback devices. The type of feedback and/or stimulus provided by the wearable devices 104*a*-104*n* may be varied according to the design criteria of a particular implementation.

One or more of the wearable devices 104*a*-104*n* may be worn by the passengers 60*a*-60*d*. In the example shown, the wearable devices 104*a*-104*b* may implement a smart watch. In the example shown, the wearable devices 104*c*-104*d* may be smart rings. Since each of the passengers 60*a*-60*d* may wear the wearable devices 104*a*-104*n*, the feedback may be observed by each of the passengers 60*a*-60*d* (e.g., not just the driver). In one example, a driving instructor in the passenger seat (e.g., the passenger 60*b*) may receive feedback (e.g., a vibration from the wearable device 104*b*) when the student driver 60*a* causes the vehicle 50 to exceed the speed limit and/or a particular speed threshold (e.g., the system 100 may enable the instructor 60*b* to monitor the speed that the student driver 60*a* is traveling at without looking away from the road and/or misread the speedometer because of the parallax effects).

The wearable devices 104*a*-104*n* may provide an alternative solution to haptic steering wheels. For example, a haptic steering wheel may provide the feedback only to the driver 60*a*. By using the wearable devices 104*a*-104*n*, the secondary feedback may be sent to both the driver 60*a* and the passengers 60*b*-60*d*. Implementing the wearable devices 104*a*-104*n* may enable the driver 60*a* and the passengers 60*b*-60*d* to have the same level of awareness of what is happening around them and/or what is happening with the vehicle 50. By using the wearable devices 104*a*-104*n*, the user (e.g., the passengers 60*a*-60*d*) may customize the haptic stimuli. The feedback provided by the wearable devices 104*a*-104*n* may be independent from the vehicle 50. For example, the feedback provided by the wearable devices 104*a*-104*n* may be vehicle neutral (e.g., the same customizations selected for the wearable devices 104*a*-104*n* may be used for many different vehicles).

Figure 2:
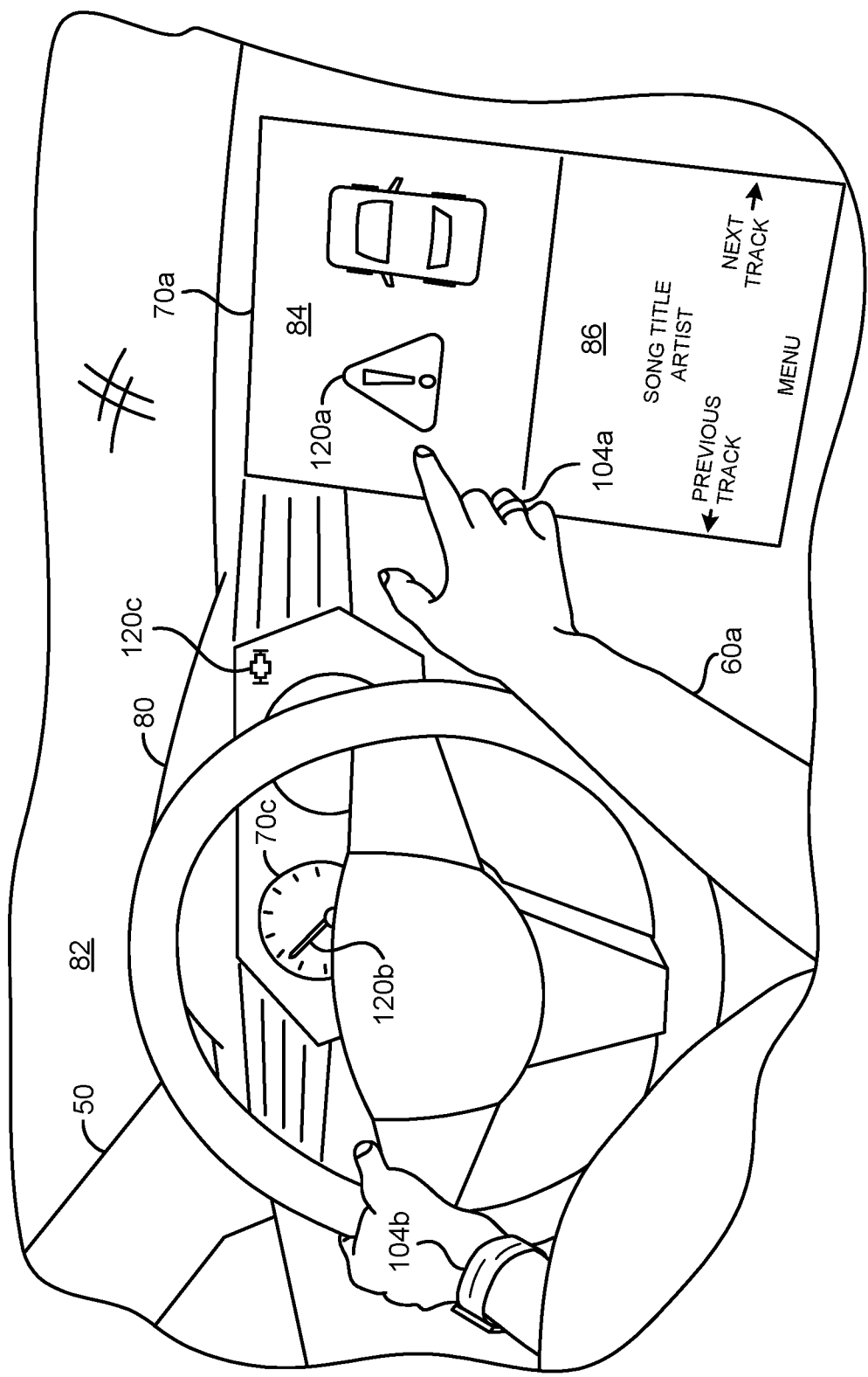
FIG. 2 is a diagram illustrating a view of a dashboard in the vehicle of FIG. 1.

Referring to FIG. 2, a view of a dashboard 80 of the vehicle 50 is shown. The dashboard 80 is shown from a perspective from the interior of the vehicle 50. The display 70*a* may be mounted on the dashboard 80. The gauge 70*c* is shown as part of the dashboard 80. The driver 60*a* is shown wearing the wearable devices 104*a*-104*b* (e.g., a ring and a watch). The driver 60*a* is shown having the wearable device 104*a* on a right hand and the wearable device 104*b* on a left wrist. The windshield 82 is shown above the dashboard 80. When driving attentively (e.g., without distraction) the driver 60*a* should be looking through the windshield 82. For example, looking at the primary feedback provided by the display 70*a* and/or the gauge 70*c* may be a source of distraction for the driver 60*a* (e.g., the driver 60*a* may look away from the windshield 82 to view the display 70*a* and/or the gauge 70*c*).

The display 70*a* is shown. In some embodiments, the display 70*a* may be a component integrated as part of the vehicle 50. In one example, the display 70*a* may be an infotainment system (e.g., a touchscreen video display and audio system). In some embodiments, the display 70*a* may be remotely connected device. For example, the display 70*a* may be a smartphone and/or a computing device configured to connect to the ADAS computing device 102 (or to other components of the vehicle 50 that enable communication of data from the computing device 102). The implementation of the display 70*a* may be varied according to the design criteria of a particular implementation.

In the example shown, the display 70*a* may have a top portion 84 and a bottom portion 86. The display 70*a* may be configured to communicate an alert from the ADAS computing device 102. In the example shown, the alert may be the primary feedback 120*a*. Generally, the primary feedback 120*a* may be displayed on the display 70*a* as an alphanumeric message, a graphic, a map with an overlay, and/or a visual cue. In the example shown, the bottom portion 86 of the display 70*a* may comprise an interface for playing music.

The ADAS computing device 102 may generate the primary feedback output and the display 70*a* may display the primary feedback (e.g., as an alert). In an example where the ADAS computing device 102 is a navigation system, the display 70*a* may display an alert that the "current lane is slow" and a suggestion to "move to the right by one lane". In the example shown, the primary feedback 120*a* may be a warning that an object is nearby on the driver side of the vehicle 50.

The primary feedback 120*b* may be a value displayed on a gauge and/or meter (e.g., a speedometer, a fuel gauge, a tachometer, etc.). In the example shown, the gauge 70*c* may be a speedometer. The primary feedback 120*b* may be the indication of the speed that the vehicle 50 is currently traveling. The primary feedback 120*c* may be a dashboard light (e.g., check engine light, seat belt light, check oil light, etc.). In the example shown, the primary feedback 120*c* may be a check engine light on the dashboard 80.

The ADAS computing device 102 may generate the primary feedback 120*a*-120*c* and secondary feedback. The secondary feedback outputs of the ADAS system 102 installed on the car 50 may be presented to the driver 60*a*, using haptic stimuli produced by the wearable devices 104*a*-104*b*. The haptic feedback may be used to support the information displayed by the onboard screen 70*a*, via acoustic signals using the speakers 70*b* and/or the gauges 70*c* (e.g., the primary feedback 120*a*-120*c*). Different from visual and audio feedback, tactile feedback using the wearable devices 104*a*-104*b* may be faster (e.g., more responsive than visual and/or audio) and/or may not require the driver 60*a* to look at the screen 70*a* and/or the gauges 70*c* (e.g., away from the windshield 82). The tactile feedback from the wearable devices 104*a*-104*b* may not be occluded by other audio sources (e.g., the music played using the bottom portion 86 of the display 70*a*).

The driver 60*a* is shown wearing two wearable devices 104*a*-104*b*. In some embodiments, the two wearable devices 104*a*-104*b* may be communicatively linked and/or customized to react in tandem (e.g., as a stereo pair) to the output provided by the computing device 102. In some embodiments, the wearable device 104*a* on the right hand of the driver 60*a* may be configured to react to feedback that corresponds to the right side of the vehicle 50 and the wearable device 104*b* on the left hand of the driver 60*a* may be configured to react to feedback that corresponds to the left side of the vehicle 50. In the example shown, the primary feedback 120*a* shows an alert to the left of the vehicle 50 on the upper portion 84 of the display 70*a*. To supplement and/or support the primary feedback 120*a*, the wearable device 104*a* may not provide feedback (e.g., since the feedback 120*a* does not correspond to the right side of the vehicle 50), and the wearable device 104*b* may provide the haptic feedback (e.g., since the feedback 120*a* does correspond to the left side of the vehicle 50). While a left-right example is described, any directionality (e.g., front-back, left-right, etc.) may be configured and/or other types of combinational feedback (e.g., both wearable devices 104*a*-104*b* provide feedback when driving too fast, the wearable devices 104*a*-104*b* provide alternating feedback when an object is in a blind spot, etc.) may be implemented according to the design criteria of a particular implementation and/or a desired customization selected by the driver 60*a*.

Figure 3:
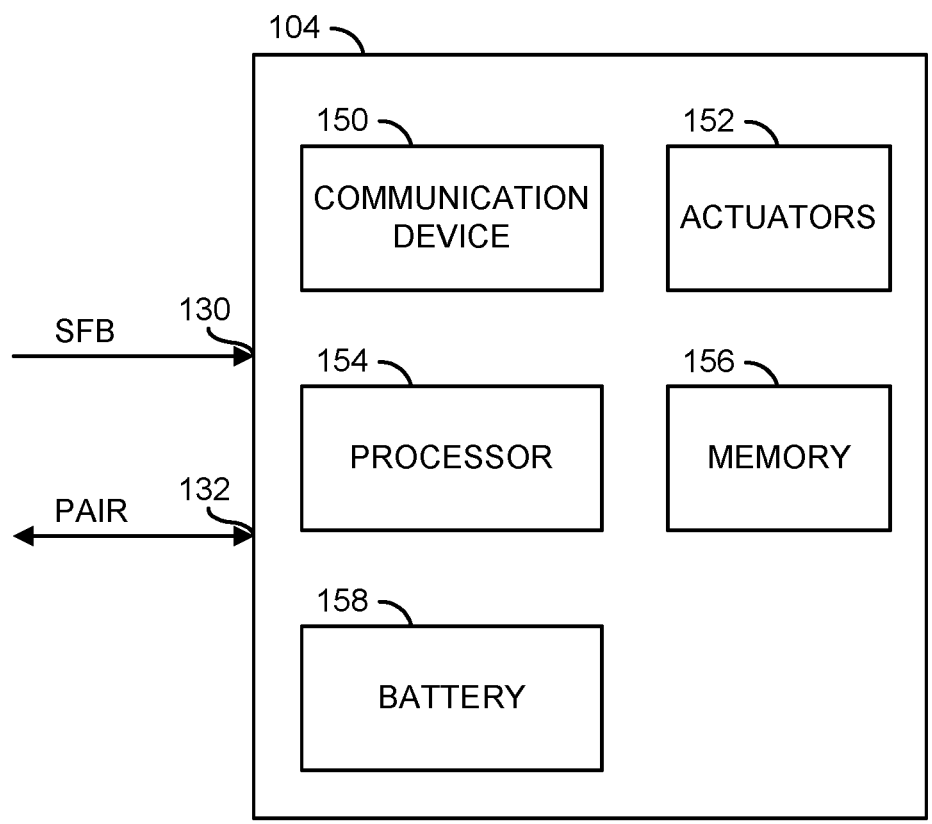
FIG. 3 is a block diagram illustrating components of a wearable feedback device.

Referring to FIG. 3, a block diagram of a wearable feedback device 104 is shown. The wearable device 104 may comprise an input 130 and/or an input/output 132. The input 130 may be configured to receive a signal (e.g., SFB). The input/output 132 may be configured to communicate a signal (e.g., PAIR). The signal SFB may be a feedback output (e.g., the secondary feedback output) presented by the ADAS computing devices 102. The signal PAIR may be implemented to establish communication between the wearable device 104 and the ADAS computing device 102. The wearable device 104 may comprise other inputs and/or outputs (not shown) such as a power input and/or communicate other signals (not shown). The number, type and/or function of the signals communicated by the wearable device 104 may be varied according to the design criteria of a particular implementation.

The wearable computing device 104 may comprise a block (or circuit) 150, a block (or circuit) 152, a block (or circuit) 154, a block (or circuit) 156 and/or a block (or circuit) 158. The circuit 150 may implement a communication device. The circuit 152 may implement one or more actuators. The circuit 154 may implement a processor. The circuit 156 may implement a memory. The circuit 158 may implement a battery. The wearable computing device 104 may comprise other components (not shown). The number, type, arrangement and/or functionality of the components of the wearable computing device 104 may be varied according to the design criteria of a particular implementation.

The communication device 150 may be configured to enable wireless communication. In some embodiments, the communication device 150 may implement Bluetooth communication. For example, the communication device 150 may generate the signal PAIR to establish a Bluetooth connection (e.g., pair) with the ADAS computing device 102. In some embodiments, the communication device 150 may implement Wi-Fi communication. In some embodiments, the communication device 150 may implement cellular communication (e.g., 3G/4G/5G/LTE). The type of communication protocols implemented by the communication device 150 may be varied according to the design criteria of a particular implementation.

The communication device 150 may be configured to wirelessly and/or remotely receive the signal SFB. The signal SFB may be the secondary feedback output generated by the ADAS computing device 102. In one example, the signal SFB may be communicated as data using the Bluetooth protocol. The signal SFB may provide general messages (e.g., high speed), sensor values (e.g., current speed is 50 mph), formatted data (e.g., codes that represent values that may be interpreted by the wearable computing device 104), etc. In some embodiments, the communication device 150 may establish communication with devices other than the ADAS computing device 102 (e.g., a smartphone, the infotainment system 70a, etc.). For example, pairing the wearable device 104 with the display 70a may provide a visual interface for customizing user settings/preferences for the wearable device 104 (e.g., a touchscreen display).

The actuators 152 may be configured to generate the feedback response. In one example, the actuators 152 may implement one or more motors. The actuators 152 may be configured to vibrate to provide the haptic feedback (e.g., haptic stimuli). The actuators 152 may respond to various output from the processor 154. For example, the actuators 152 may generate various vibration patterns in response to the output generated by the processor 154. While one block 152 is shown, a number of motors may be implemented throughout the wearable device 104 to provide the haptic feedback all around the body part that the wearable device 104 is worn on.

The processor 154 may be configured to receive input, process the input, make decisions in response to the input, control the various components of the wearable device 104 and/or generate output. Generally, the processor 154 may control the functionality of the wearable device 104. The processor 154 may be configured to decode and/or analyze the data from the signal SFB. The processor 154 may generate an output in response to the signal SFB. For example, the output response may be presented to the actuators 152 to initiate the haptic feedback.

The memory 156 may provide storage and/or working memory for the wearable user device 104. The memory 156 may store customizable user settings. For example, the customizable user settings may comprise particular types of haptic feedback for particular data received from the signal SFB. In another example, the customizable user settings may comprise thresholds for activating the haptic feedback (e.g., the haptic feedback may be generated if the current speed of the vehicle 50 is above a selected user setting of 50 mph). The memory 156 may enable the user preferences to be used for multiple vehicles. For example, the wearable user device 104 may provide the haptic feedback when any vehicle implementing the ADAS computing device 102 provides information indicating that the current speed of the vehicle is greater than 50 mph. Since the user settings may be stored in the memory 156, the wearable device 104 may provide the same types of feedback regardless of the vehicle that the user is riding. The types of user settings and/or the preferences available may be varied according to the design criteria of a particular implementation.

In some embodiments, the processor 154 may compare the information from the signal SFB with the user settings stored in the memory 156. If the information interpreted by the processor 154 from the signal SFB matches a criteria defined by the user settings, the processor 154 may enable the haptic feedback pattern according to the user settings stored in the memory 156. In one example, if the passenger 60b has a user preference providing that a strong pulsing vibration be generated when the vehicle 50 is departing a lane, then the processor 154 may provide an output to the actuators 152 for the strong pulsing vibration when the information provided by the signal SFB indicates a lane departure warning. In an example, if there is no user setting defined for a particular notification from the signal SFB, then the processor 154 may provide a generic haptic feedback (e.g., corresponding to a short medium-strength vibration).

The battery 158 may provide a power source for the wearable device 104. The battery 158 may be rechargeable. The battery 158 may provide sufficient power to enable the wireless communication, enable the processing by the processor 154 and/or generate the haptic feedback. The battery 158 may enable the wearable device 104 to be worn without a wired connection to a power source.

Figure 4:
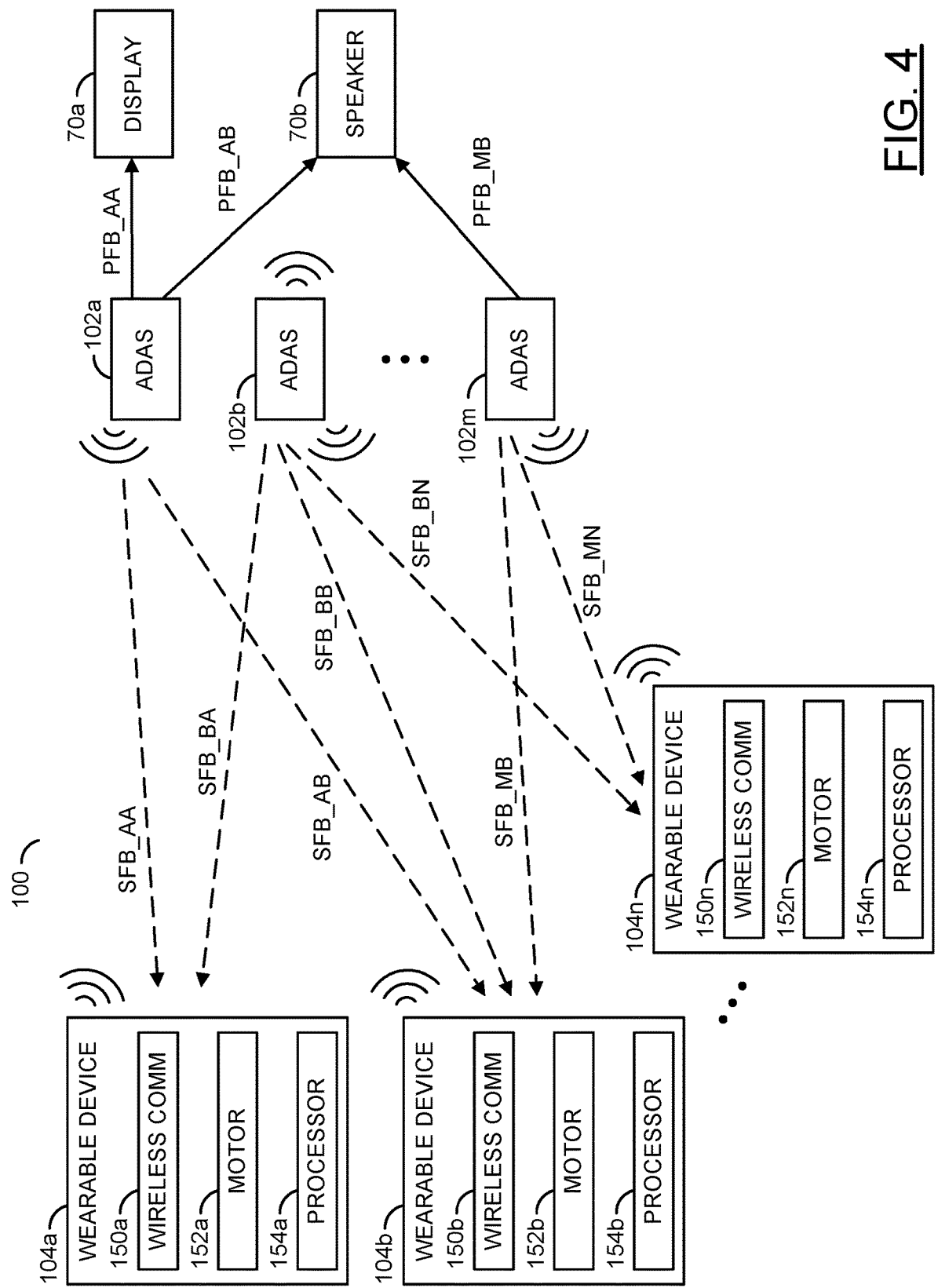
FIG. 4 is a block diagram illustrating wearable feedback devices communicating with vehicle systems.

Referring to FIG. 4, a block diagram illustrating wearable feedback devices 104a-104n communicating with vehicle systems is shown. The system 100 may comprise the wearable devices 104a-104n, a number of ADAS computing devices 102a-102m and/or a number of primary feedback devices 70a-70b. Each of the ADAS computing devices 102a-102m may be configured to communicate with one or more of the wearable devices 104a-104n. Each of the ADAS computing devices 102a-102m may communicate using a wireless and/or near-field communication protocol. While the wearable devices 104a-104n, the computing devices 102a-102m and/or the primary feedback devices 70a-70b are shown, the number of each of the components of the system 100 may be varied according to the design criteria of a particular implementation. Generally, the number of computing devices may be referred to as 102a-102n, the number of wearable devices may be referred to as 104a-104n and/or the number of primary feedback devices may be referred to as 70a-70n.

The ADAS computing devices 102a-102m may communicate the primary feedback output to the primary feedback devices 70a-70b. In the example shown, the ADAS computing device 102a is shown communicating a signal (e.g., PFB_AA) and a signal (e.g., PFB_AB). The signal PFB_AA may be the primary feedback signal from the ADAS computing device 102a to the primary feedback device (e.g., the display) 70a. In one example, the display 70a may be an infotainment system with a touchscreen display and the primary feedback signal PFB_AA may be a video signal. The signal PFB_AB may be the primary feedback signal from the ADAS computing device 102a to the primary feedback device (e.g., the speaker) 70b. In one example, the primary feedback device 70b may be a speaker and the primary feedback signal PFB_AB may be an audio signal. In the example shown, the ADAS computing device 102m is shown communicating a signal (e.g., PFB_MB). The signal PFB_MB may be the primary feedback signal from the ADAS computing device 102m to the primary feedback device (e.g., the speaker) 70m. In some embodiments, the various ADAS computing devices 102a-102m may communicate to one or more (or none) of the primary feedback devices 70a-70b. Which of the ADAS computing devices 102a-102m communicate to which of the primary feedback devices 70a-70b may be varied according to the design criteria of a particular implementation and/or the type of alert that should be presented to the driver 60a.

The ADAS computing devices 102a-102m may communicate the secondary feedback output to the wearable devices 104a-104n. In the example shown, the ADAS computing device 102a is shown communicating a signal (e.g., SFB_AA) and a signal (e.g., SFB_AB). The signal SFB_AA may be the secondary feedback signal from the ADAS computing device 102a to the wearable device 104a. The signal SFB_AB may be the secondary feedback signal from the ADAS computing device 102a to the wearable device 104b. Similarly, the ADAS computing device 102b is shown presenting the secondary feedback signals SFB_BA, SFB_BB and SFB_BN and the ADAS computing device 102m is shown presenting the secondary feedback signals SFB_BB and SFB_MN. Which of the ADAS computing devices 102a-102m communicate to which of the wearable devices 104a-104n may be varied according to the design criteria of a particular implementation.

The ADAS computing devices 102a-102n may be configured to analyze one or more vehicle systems of the vehicle 50. The ADAS computing devices 102a-102n may be configured to generate the primary output signal(s) (e.g., PFB_AA-PFB_MB) and/or the secondary output signal(s) (e.g., SFB_AA-SFB_MN) in response to the vehicle systems. For example, the ADAS computing device 102a may analyze a vehicle system (e.g., receive information from a brake system of the vehicle 50 and interpret the information to generate vehicle information data) and generate the signal PFB_AA and/or the signal SFB_AA in response to the analysis of the vehicle system.

Figure 5:
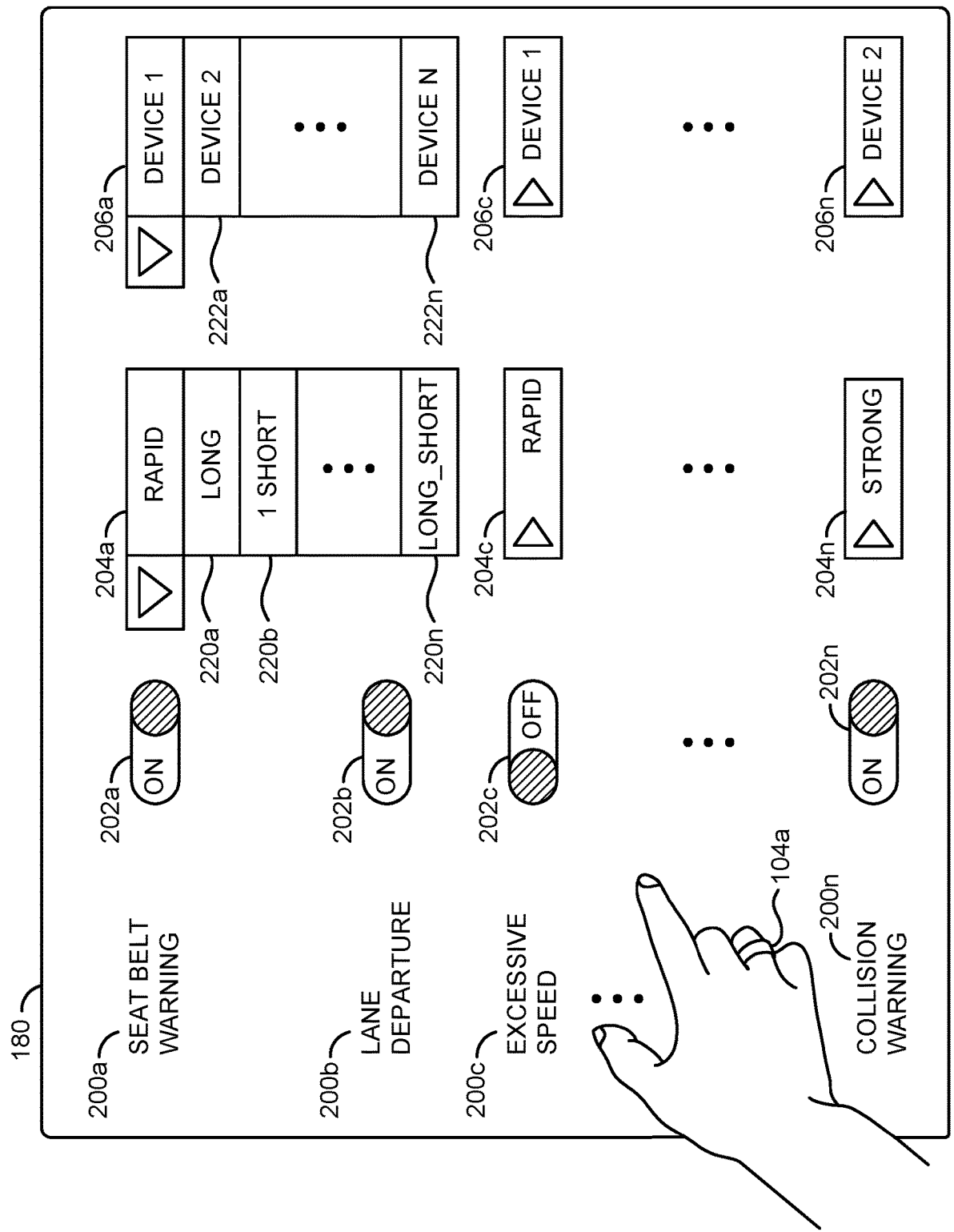
FIG. 5 is a diagram illustrating an example interface for customizing feedback of a wearable device.

Referring to FIG. 5, a diagram illustrating an example interface 180 for customizing feedback settings of the wearable devices 104a-104n is shown. In an example, the interface 180 may be accessed using the display 70a when at least one of the wearable devices 104a-104n have been paired with the infotainment system of the vehicle 50. In another example, the interface 180 may be accessed using a desktop computer. In yet another example, the interface 180 may be accessed using a smartphone and/or other portable device (e.g., a tablet computing device). In the example shown, the interface 180 may be implemented on a touchscreen device. The method of accessing the interface 180 may be varied according to the design criteria of a particular implementation.

The interface 180 may enable the user of the wearable devices 104a-104n to customize various conditions and/or criteria for responding to the information received from the ADAS computing devices 102a-102n. Customizing the types of feedback responses may enable the passengers 60a-60d to understand and/or distinguish between the information provided by the ADAS computing devices 102a-102n (e.g., without looking at the wearable devices 104a-104n). For example, if the driver 60a customizes the settings for the wearable device 104a to provide a short vibration when an object is detected in the blind spot, the driver 60a may know that an object is in the blind spot if the wearable device 104a provides a short vibration (e.g., without the driver 60a taking his/her eyes off the road).

Customizing the responses may enable the passengers 60a-60d to provide the same responses to information provided by the ADAS computing devices 102a-102n even when in different vehicles. For example, if the user customizes the settings for the wearable device 104a to provide a short vibration when a vehicle is traveling more than 60 mph, then the wearable device 104a may provide the short vibration when the user is in a car traveling more than 60 mph or traveling in a minivan traveling more than 60 mph (provided that both the car and the minivan implement the ADAS computing devices 102a-102n).

In the example shown, the example interface 180 may display a number of conditions 200a-200n, a number of switches 202a-202n, a number of haptic feedback responses 204a-204n and/or a number of device options 206a-206n. The example interface 180 may provide a representative illustration of potential options available for customizing the responses of the wearable devices 104a-104n. The various customization settings for the wearable devices 104a-104n may be stored by the respective memory blocks 156a-156n. The number and/or types of customization settings available and/or the look and/or layout of the interface 180 may be varied according to the design criteria of a particular implementation.

The example interface 180 is shown displaying a number of the conditions 200a-200n. The conditions 200a-200n may be a criteria for activating the haptic feedback of the wearable devices 104a-104n. The conditions 200a-200n may correspond to information provided by the ADAS computing devices 102a-102n (e.g., the information transmitted using the signal SFB). The conditions 200a-200n may correspond to thresholds related to the information provided by the ADAS computing devices 102a-102n (e.g., the ADAS computing devices 102a-102n may present a raw speed value (e.g., 40 mph) and the conditions 200a-200n may define a high speed value as any raw speed value above a threshold of 60 mph).

In the example shown, the condition 200a may be a seat belt warning (e.g., whether the passenger 60a-60d is wearing a seatbelt). In the example shown, the condition 200b may be a lane departure (e.g., when the vehicle 50 is close to leaving the boundary of the current lane). In the example shown, the condition 200c may be an excessive speed (e.g., when the vehicle 50 is traveling faster than a pre-defined threshold speed). In the example shown, the condition 200n may be a collision warning (e.g., when the vehicle 50 is close to colliding with another vehicle and/or object). The conditions 200a-200n available may be varied according to the design criteria of a particular implementation.

The example interface 180 is shown displaying a number of the switches 202a-202n. The switches 202a-202n may be used to enable or disable (e.g., turn on or off) the haptic feedback by the wearable devices 104a-104n for the respective conditions 200a-200n. In the example shown, since the switch 202a is on, the wearable device 104a may provide haptic feedback when one or more of the ADAS computing devices 102a-102n provide information indicating that the seatbelt is not connected (e.g., the seatbelt warning condition 200a). In the example shown, since the switch 202c is off, the wearable device 104a may not provide haptic feedback when the speed of the vehicle 50 is above a pre-defined threshold.

The example interface 180 is shown displaying a number of the haptic response options 204a-204n. The haptic responses options 204a-204n may be various types of haptic feedback provided by the wearable devices (e.g., patterns, strength of vibration, frequency of vibration, length of vibration, etc.). In the example shown, the haptic response option 204a and the haptic response option 204c may be a rapid vibration (e.g., quick pulses of vibration). In the example shown, the haptic response option 204n may be a strong vibration (e.g., a vibration at the maximum output level for the actuator 152). In the example interface 180 shown, the haptic response options 204a-204n are displayed as drop-down menus.

In the example interface 180 shown, the drop-down menu for the haptic response option 204a is shown. A number of types of feedback selections 220a-220n are shown. For example, the type of feedback selection 220a may be a relatively long vibration. In another example, the type of feedback selection 220b may be one relatively short vibration. In yet another example, the type of feedback selection 220n may be alternating long and short pulses. The number of types of feedback responses available may be limited by the types of feedback that the wearable devices 104a-104n may be capable of producing.

The example interface 180 is shown displaying a number of the device options 206a-206n. The device options 206a-206n may provide settings that enable the user to assign the haptic feedback to one or more of the wearable devices 104a-104n. For example, since the device option 206c is set to 'device 1', the haptic feedback for the condition 200c may be performed by the wearable device 104a (but not any other of the wearable devices 104a-104n). In another example, since the device option 206n is set to 'device 2', the haptic feedback for the condition 200n may be performed by the wearable device 104n. In the example interface 180 shown, the device options 206a-206n are displayed as drop-down menus.

In the example interface 180 shown, the drop-down menu for the device options 206a is shown. A number of device selections 222a-222n are shown. The device selections 222a-222n may be used to assign particular haptic responses to one or more of the wearable user devices 104a-104n. For example, one of the haptic response options 204a-204n may be assigned to the wearable device 104a worn on the left hand and another of the haptic response options 204a-204n may be assigned to the wearable device 104b worn on the right hand. In another example, one of the haptic response options 204a-204n may be assigned to both of the wearable devices 104a-104b simultaneously. In yet another example, one or more of the haptic response options 204a-204n may be assigned to all of the wearable devices 104a-104n.

In some embodiments, the customization may provide options that may enable some features depending on environmental conditions (e.g., the time of day, on the light conditions, on visibility, etc.). For example, a user may choose to automatically receive notifications from the drowsiness-detection system and/or from the departure warning system (e.g., one or more of the ADAS computing devices 102a-102n) during the night-time hours. In another example, a user may choose to automatically receive notifications from the lane departure warning system in low light and/or low visibility conditions (but not in other conditions). Selecting the conditions 200a-200n as desired may enable the users to receive some notifications, but not every possible notification (e.g., too many notifications may be a nuisance and/or distracting).

In some embodiments, one of the conditions 200a-200n may be an automatic notification of speed limits (e.g., haptic feedback when a speed limit has changed) and/or speed cameras (e.g., a notification that a speed camera and/or police officer is nearby). In some embodiments, one of the conditions 200a-200n may be an automatic notification of GPS directions in crowded scenarios (e.g., one of the wearable devices 104a-104n on each hand, and a vibration may be performed on the hand corresponding to the change in direction according to the navigation directions). In some embodiments, a GPS location may be used as one of the conditions 200a-200n to prevent notifications when the vehicle 50 is near the home of the driver 60a. For example, the driver 60a may not want the haptic feedback for a door ajar notification when backing out at home (e.g., the driver 60a may have the door open to see when towing a boat).

Figure 6:
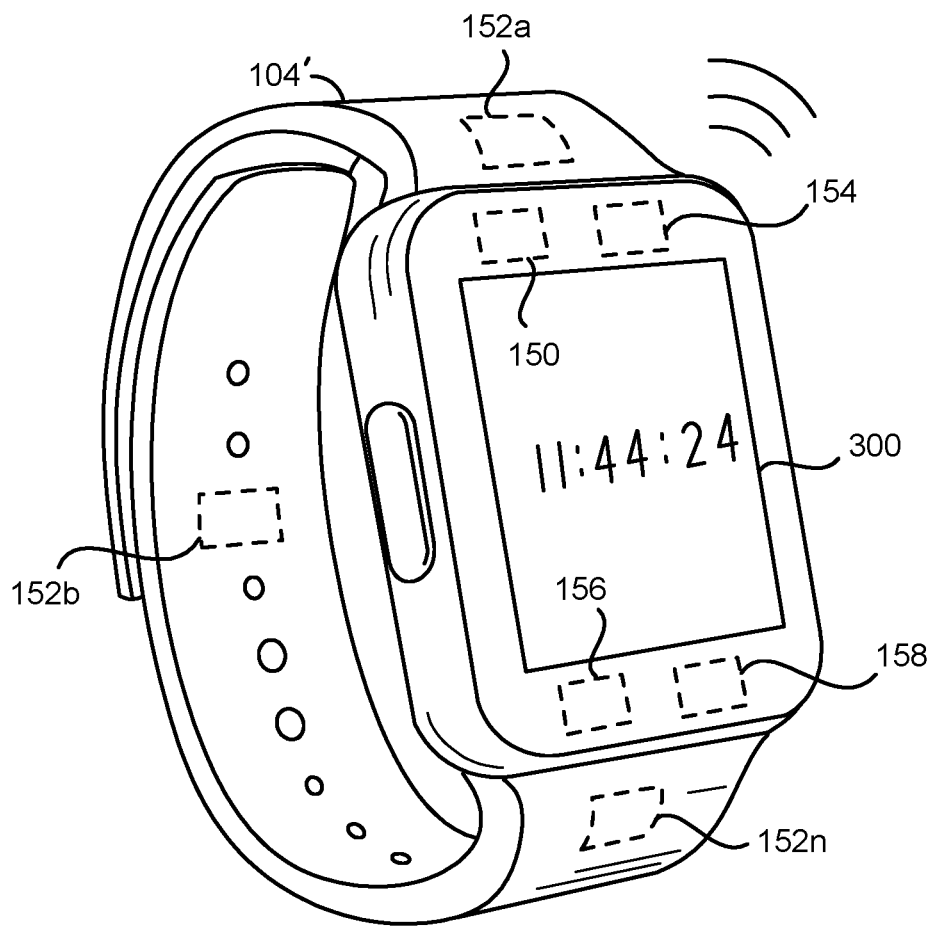
FIG. 6 is a diagram illustrating an example smart watch embodiment of the wearable feedback device.

Referring to FIG. 6, a diagram illustrating an example smart watch embodiment of the wearable feedback device 104' is shown. The smart watch wearable device embodiment 104' may be worn on the wrist of the passengers 60a-60d. The smart watch wearable device 104' may be implemented as a smart watch, a fitness tracker, a health monitor, etc.

The smart watch wearable device 104' may comprise the communication device 150, the processor 154, the memory 156 and/or the battery 158. The actuators 152a-152n are shown located around the wristband of the smart watch wearable device 104'. Spreading the location of the actuators 152a-152n around the wristband may enable more fine-tuned control of the type of feedback vibrations generated and/or enable body location-based responses (e.g., one type of vibration may be on top of the wrist, one type of vibration may be at the bottom of the wrist, etc.).

The smart watch wearable device 104' may comprise a touchscreen display 300. In some embodiments, the touchscreen display 300 may be used to interact with the interface 180. The touchscreen display 300 is shown displaying a time. In some embodiments the touchscreen display 300 may enable the user to interact with the alternate functionality (e.g., default operations) of the smart watch (e.g., view text messages, view email, receive weather updates, change the music on the bottom portion 86 of the display 70a, etc.). For example, the wearable device 104' may provide traditional functionality of the smart watch (e.g., default operations), as well as the feedback functionality for the system 100. The functionality provided by the smart watch 104' may be varied according to the design criteria of a particular implementation.

Figure 7:
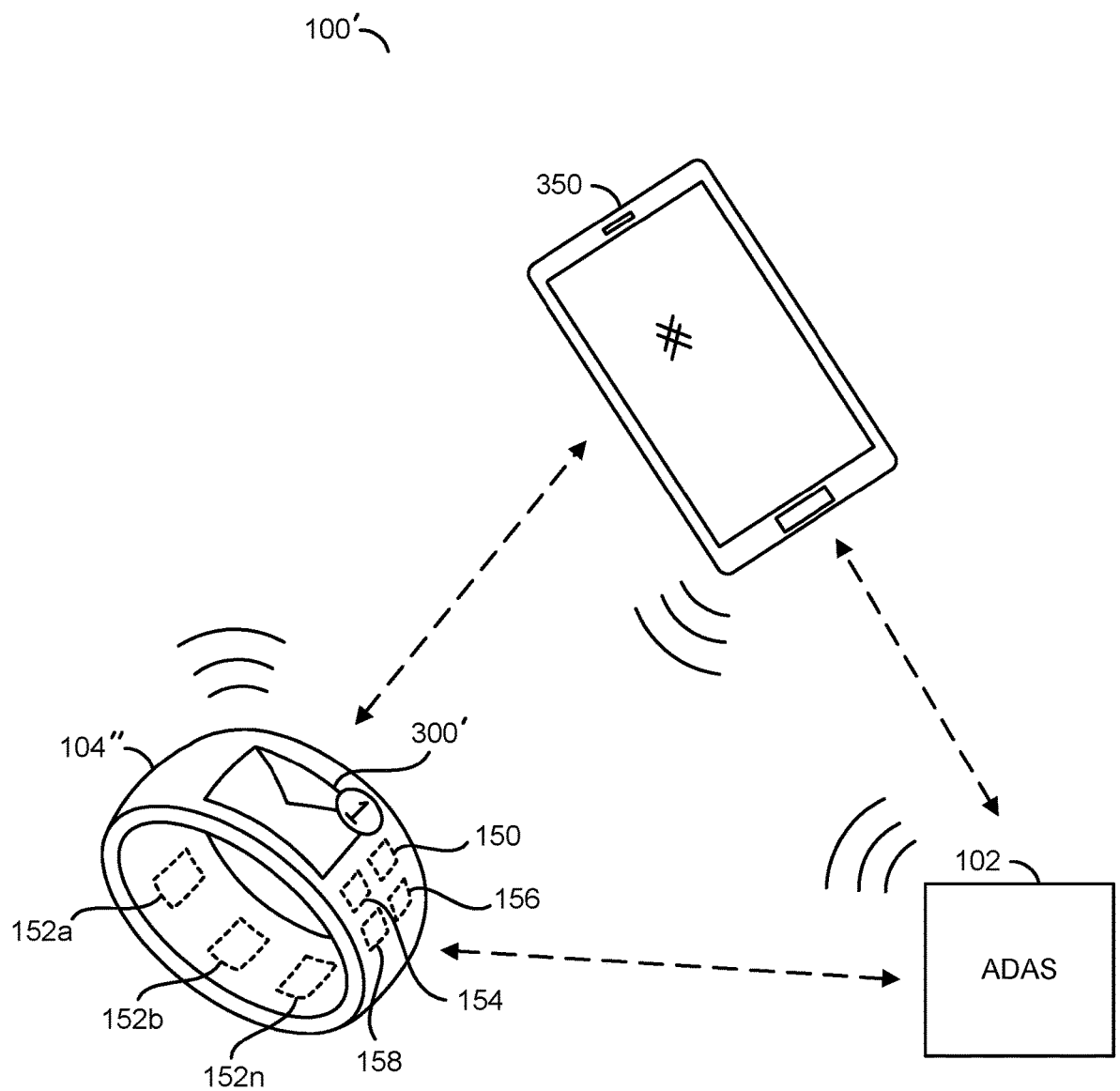
FIG. 7 is a diagram illustrating an example wearable device tethered to a smartphone.

Referring to FIG. 7, a diagram illustrating an example wearable device 104" tethered to a smartphone is shown. The system 100' may comprise the ADAS computing device 102, the wearable device 104" and/or the portable computing device 350 (e.g., a user device). In the example shown, the portable computing device 350 may be a smartphone. In some embodiments, the portable computing device 350 may be a tablet computing device, a phablet, a laptop computer, etc.

The wearable device 104" is shown as a smart ring (e.g., a smart device worn on the finger). Implementing the wearable device 104" as a smart ring may enable multiple wearable devices 104a-104n to be worn on each hand by the passengers 60a-60d. In the example shown, the wearable device 104" may comprise the communication device 150, the processor 154, the memory 156 and/or the battery 158. The actuators 152a-152n are shown located around the inner ring surface of the wearable device 104". The wearable device 104" is shown comprising a screen 300'. For example, the screen 300' may present visual notification (e.g., to provide the default operation functionality of the smart ring with the haptic feedback functionality of the system 100'). In some embodiments, the screen 300' may be a touchscreen interface and may be capable of providing the interface 180.

In some embodiments, the smart ring embodiment of the wearable device 104" may have limited functionality (e.g., the small form factor may limit the processing power, memory capacity, battery life, complexity, etc.). In order to provide the full functionality of the wearable devices 104a-104n and/or to supplement the functionality of the wearable devices 104a-104n, the wearable device 104" may be configured to communicate with the portable computing device 350. For example, the smart ring 104" may be tethered to the smartphone 350 to enable the smart ring 104" to rely on the functionality of the smartphone 350 for some operations (e.g., displaying the interface 180, storing one or more of the user settings, extending the communication range, leveraging the connectivity of the smartphone 350 to the components of the vehicle 50, etc.).

The system 100' shows the smart ring 104", the smartphone 350 and the ADAS computing device 102 each communicating with each other. For example, to conserve power, the smart ring 104" may enter a low-powered, limited-functionality sleep mode and the smartphone 350 may handle communication with the ADAS computing device 102. When feedback is provided by the ADAS computing device 102, the smartphone 350 may provide a wakeup signal to enable full functionality of the smart ring 104" and then the smart ring 104" may provide the haptic feedback.

Figure 8:
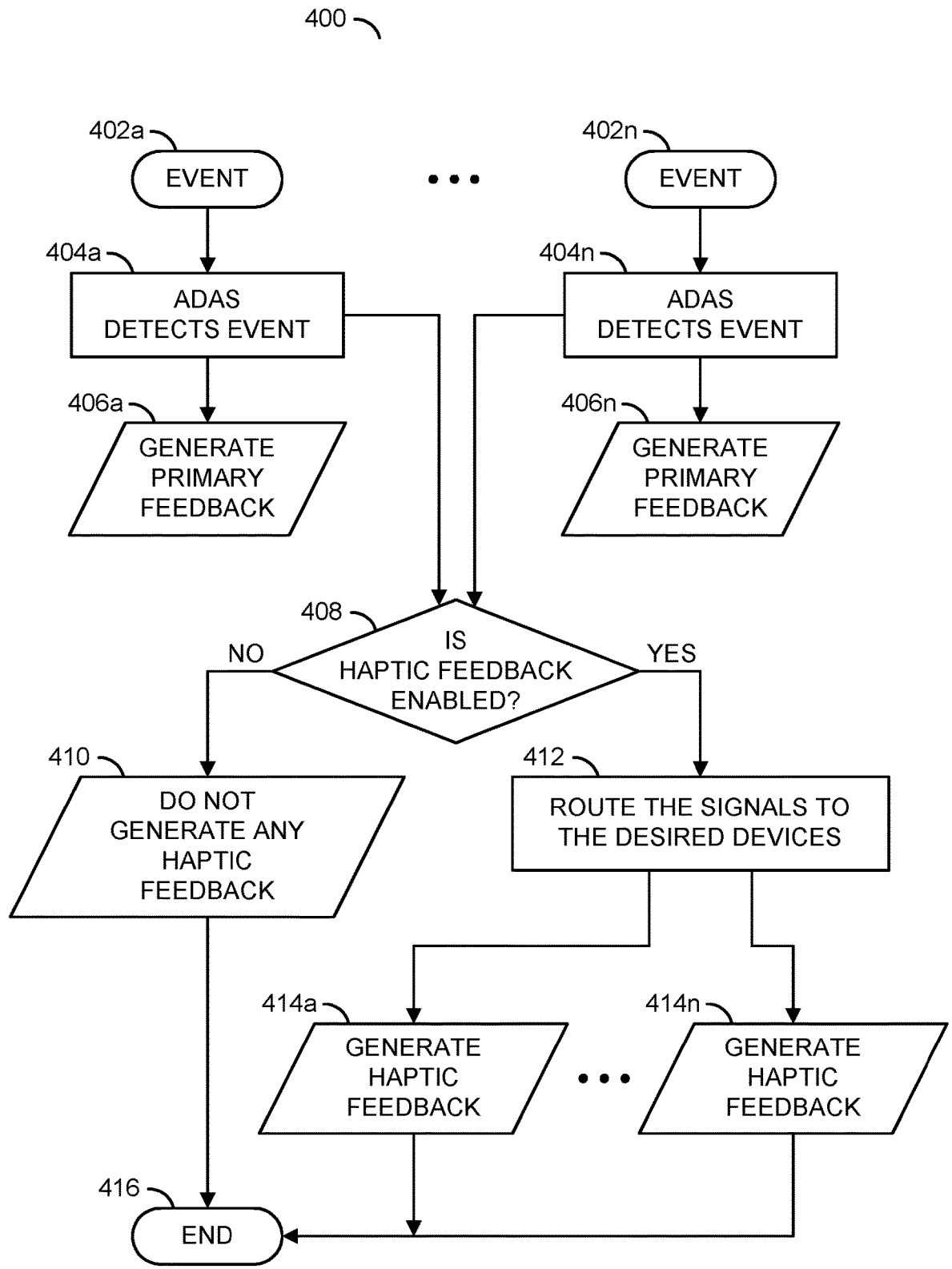
FIG. 8 is a flow diagram illustrating a method for detecting an ADAS event and generating haptic feedback.

Referring to FIG. 8, a method (or process) 400 is shown. The method 400 may detect an ADAS event and generate haptic feedback. The method 400 generally comprises steps (or states) 402a-402n, steps (or states) 404a-404n, steps (or states) 406a-406n, a decision step (or state) 408, a step (or state) 410, a step (or state) 412, steps (or states) 414a-414n, and a step (or state) 416.

One or more of the steps 402a-402n may start the method 400. The steps 402a-402n may be an occurrence of an event. The event may be stimuli and/or measurements that may be detected by the sensors and/or sub-systems of the vehicle 50 (e.g., speed adjustment, brakes applied, change in temperature, change of direction, moisture detected, etc.). Next, in one or more of the steps 404a-404n, the ADAS computing devices 102a-102n may detect the event. The various ADAS computing devices 102a-102n may work in parallel to detect various events simultaneously. In some embodiments, only one event may be detected. The ADAS computing devices 102a-102n may detect and/or interpret the event and generate data (e.g., vehicle information) in response to the event. Next, the method 400 may move to one or more of the steps 406a-406n and/or the decision step 408. In one or more of the steps 406a-406n, the ADAS computing devices 102a-102n may generate the primary feedback (e.g., present the signals PFB_AA-PFB_MN to one or more of the primary feedback devices 70a-70n).

In the decision step 408, the ADAS computing devices 102a-102n may determine whether haptic feedback is enabled. For example, the ADAS computing devices 102a102n may determine whether any of the wearable devices 104a-104n have been enabled and/or connected (e.g., based on the presence of the signal PAIR). If the haptic feedback has not been enabled, the method 400 may move to the step 410. In the step 410, the wearable devices 104a-104n may not generate any haptic feedback (e.g., the ADAS computing devices 102a-102n may not present the output signals SFB_AA-SFB_MN and/or the output signals SFB_AA-SFB_MN may be ignored by the wearable devices 104a-104n). Next, the method 400 may move to the step 416.

In the decision step 408, if the haptic feedback has been enabled, the method 400 may move to the step 412. In the step 412, the ADAS computing devices 102a-102n may route the secondary feedback signals SFB_AA-SFB_MN to the desired wearable devices 104a-104n (e.g., based on which of the devices that may respond to the vehicle information). In some embodiments, the secondary feedback signals SFB_AA-SFB_MN may be presented to each of the wearable devices 104a-104n and the feedback settings stored by the wearable devices 104a-104n may determine the desired response. Next, in one or more of the steps 414a-414n, the wearable devices 104a-104n may generate the haptic feedback. The number of steps 414a-414n may depend on the number of wearable devices 104a-104n that are connected and/or the feedback settings. Next, the method 400 may move to the step 416. The step 416 may end the method 400.

Figure 9:
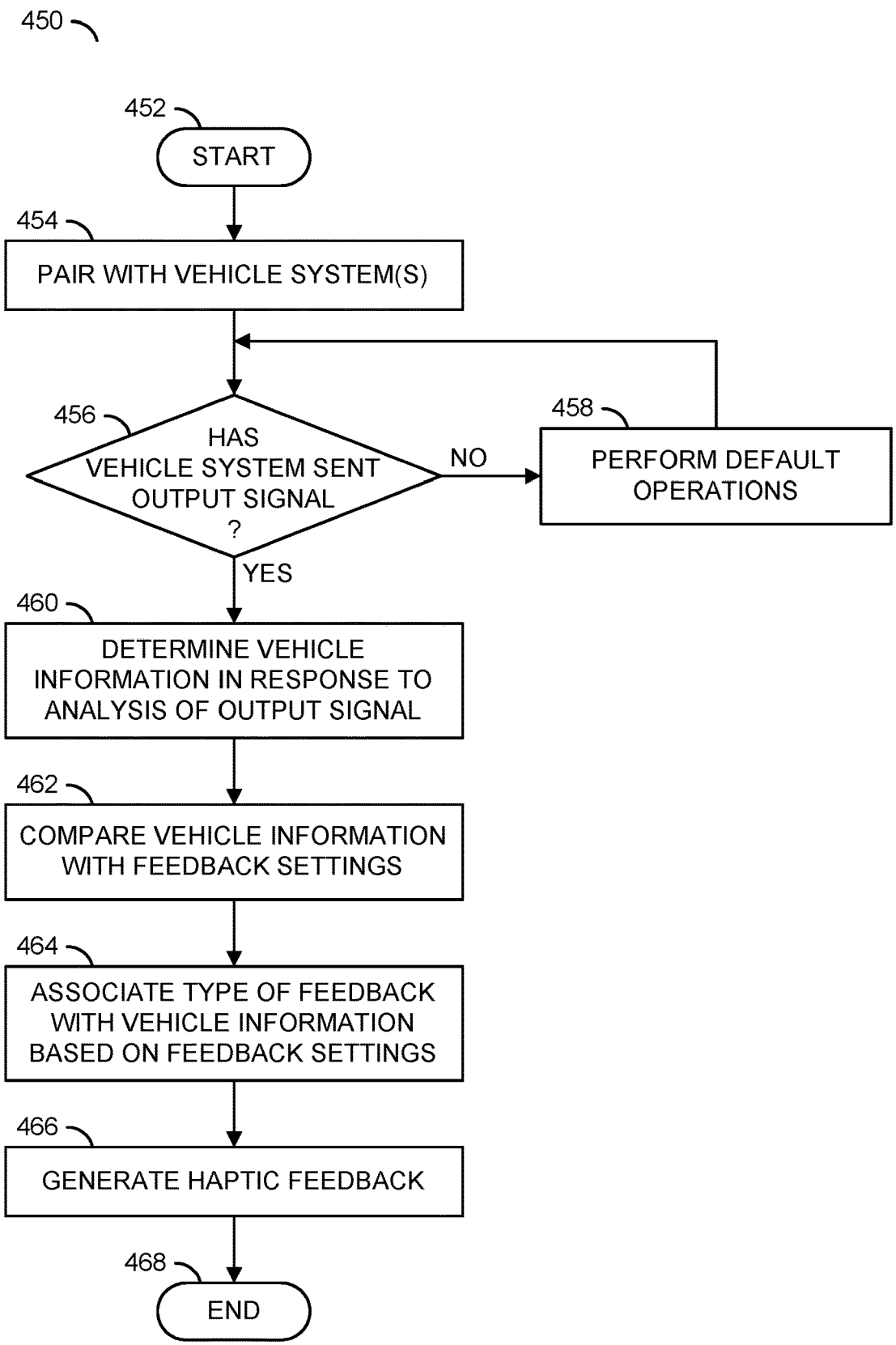
FIG. 9 is a flow diagram illustrating a method for generating haptic feedback in response to vehicle information.

Referring to FIG. 9, a method (or process) 450 is shown. The method 450 may generate haptic feedback in response to vehicle information. The method 450 generally comprises a step (or state) 452, a step (or state) 454, a decision step (or state) 456, a step (or state) 458, a step (or state) 460, a step (or state) 462, a step (or state) 464, a step (or state) 466, and a step (or state) 468.

The step 452 may start the method 450. In the step 454, the wearable devices 104a-104n may pair with the vehicle system(s) 102a-102n. For example, the signal PAIR may be established between the communication devices 150 of one or more of the wearable devices 104a-104n and one or more of the ADAS computing devices 102a-102n. Next, the method 450 may move to the decision step 456.

In the decision step 456, the communication device 150 may determine whether one or more of the vehicle systems 102a-102n has sent the output signal SFB. If not, the method 450 may move to the step 458. In the step 458, the wearable devices 104a-104n may perform default operations. Next, the method 450 may return to the decision step 456. In the decision step 456, if the output signal SFB has been sent, the method 450 may move to the step 460.

In the step 460, the processor 154 may determine the vehicle information in response to the analysis of the output signal SFB. In one example, the signal SFB may provide the speed that the vehicle 50 is currently traveling and the processor 154 may determine the speed from the signal SFB. Next, in the step 462, the processor 154 may compare the vehicle information to the feedback settings stored in the memory 156. In the step 464, the processor 154 may associate the type of feedback with the vehicle information based on the feedback settings. Next, in the step 466, the processor 154 may provide signals to the actuator 152 to generate the haptic feedback. The haptic feedback may be generated in response to the type of feedback associated with the vehicle information. Next, the method 450 may move to the step 468. The step 468 may end the method 450.

Figure 10:
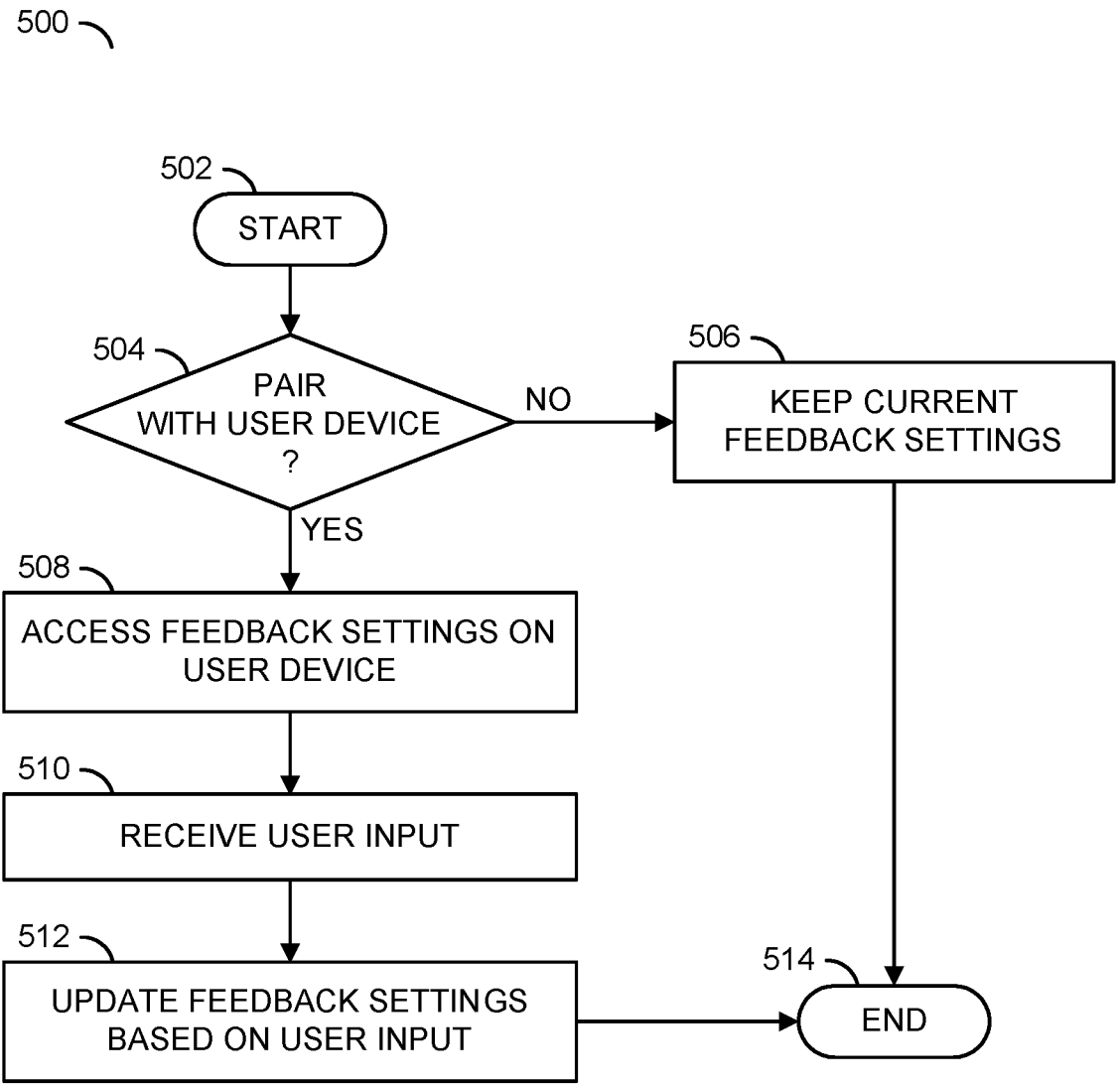
FIG. 10 is a flow diagram illustrating a method for updating feedback settings.

Referring to FIG. 10, a method (or process) 500 is shown. The method 500 may update feedback settings. The method 500 generally comprises a step (or state) 502, a decision step (or state) 504, a step (or state) 506, a step (or state) 508, a step (or state) 510, a step (or state) 512, and a step (or state) 514.

The step 502 may start the method 500. Next, in the decision step 504, the communication device 150 may determine whether to pair with the user device 350 (e.g., the portable communication device shown in association with FIG. 7). For example, the user may initiate the pairing between the wearable user devices 104a-104n and the user device 350 (e.g., a smartphone with a touchscreen display that may have a more accessible interface than the wearable devices 104a-104n). If the communication device 150 does not pair with the user device 350, the method 500 may move to the step 506. In the step 506, the wearable user devices 104a-104n may keep the current feedback settings (e.g., stored in the memory 156). Next, the method 500 may move to the step 514.

In the decision step 504, if the communication device 150 does pair with the user device 350, the method 500 may move to the step 508. In the step 508, the user may access and/or interact with the feedback settings for the wearable devices 104a-104n using the interface 180 presented on the user device 350. Next, in the step 510, the interface 180 may receive user input (e.g., the user may select various feedback settings). In the step 512, the memory 156 may store the updated feedback settings based on the user input. Next, the method 500 may move to the step 514. The step 514 may end the method 500.

Referring to FIG. 11, a method (or process) 550 is shown. The method 550 may associate a type of feedback with vehicle information based on feedback settings. The method 550 generally comprises a step (or state) 552, a step (or state) 554, a step (or state) 556, a decision step (or state) 558, a decision step (or state) 560, a step (or state) 562, a decision step (or state) 564, a step (or state) 566, a step (or state) 568, a step (or state) 570, and a step (or state) 572.

The step 552 may start the method 550. In the step 554, the vehicle information may be received by the communication device 150 and/or the processor 154 based on the output signal SFB. Next, in the step 556, the processor 154 may compare the vehicle information with the criteria of the conditions 200a-200n. For example, the criteria for the condition 200a shown in association with FIG. 5 may be whether the seatbelt is connected. Next, the method 550 may move to the decision step 558.

In the decision step 558, the processor 154 and/or the memory 156 may determine whether the haptic feedback has been turned off for the particular condition indicated by the vehicle information. For example, the switch 202c shown in association with FIG. 5 indicates that the feedback setting for the condition 200c has been turned off. If the haptic feedback has been turned off for the condition, the method 550 may move to the step 562. If the haptic feedback has been turned on for the condition, the method 550 may move to the decision step 560.

In the decision step 560, the processor 154 and/or the memory 156 may determine whether the particular one of the devices 104a-104n has been selected for the particular condition. For example, the processor 154 of the wearable device 104a may check whether the feedback settings indicate that the wearable device 104a has been selected for the particular condition. In an example, the device option 206c indicates that device 1 (e.g., the wearable device 104a) has been selected for the condition 200c as shown in association with FIG. 5. If the device has not been selected for the condition, the method 550 may move to the step 562. In the step 562 the actuators 152 may not generate the haptic feedback. Next, the method 550 may move to the step 572.

In the decision step 560, if the device has been selected for the condition, the method 550 may move to the decision step 564. In the decision step 564, the processor 154 and/or the memory 156 may determine whether the condition has a customized response. For example, the customized response 204c may be a rapid pulse haptic feedback for the condition 200c. If the condition does not have a customized response, the method 550 may move to the step 566. In the step 566, the processor 154 may select a default type of feedback (e.g., the initial feedback settings for the wearable device 104a may have a default and/or fallback feedback setting for each of the conditions 200a-200n). Next, the method 550 may move to the step 570.

In the decision step 564, if the condition does have a customized response, the method 550 may move to the step 568. In the step 568, the processor 154 may select the customized type of feedback. Next, the method 550 may move to the step 570. In the step 570, the actuators 152 may generate the haptic feedback based on the selected haptic feedback (e.g., the default type of feedback or one of the customized types of feedback). Next, the method 550 may move to the step 572. The step 572 may end the method 550.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A system comprising:
a processor configured to (i) analyze one or more vehicle systems and (ii) generate a first output signal and a second output signal corresponding to said vehicle systems; and
a device configured to (i) receive said second output signal and (ii) generate haptic feedback based on said second output signal and one or more feedback settings stored on said device, wherein
(a) said first output signal is presented to enable feedback using a primary feedback device,
(b) said device is worn by a user,
(c) said haptic feedback supports information provided by said primary feedback device,
(d) said second output signal is communicated to said device using wireless communication, and
(E) said haptic feedback is generated after comparing said second output signal to feedback settings stored on said device.

2. The system according to claim 1, wherein said haptic feedback enables information corresponding to said first output signal to be provided to said user of said device without said user looking away from a road.

3. The system according to claim 1, wherein said primary feedback device is an infotainment system and said first output signal is a video signal.

4. The system according to claim 1, wherein said primary feedback device is an audio system and said first output signal is an audio signal.

5. The system according to claim 1, wherein said vehicle systems implement Advanced Driver-Assistance Systems (ADAS).

6. The system according to claim 1, wherein said user a driver of a vehicle.

7. The system according to claim 6, wherein one or more passengers of a vehicle receive the same haptic feedback sent to said driver.

8. The system according to claim 1, wherein a type of said haptic feedback corresponding to said second output signal is customizable.

9. The system according to claim 8, wherein said type of said haptic feedback is independent from a vehicle.

10. The system according to claim 1, wherein said haptic feedback is enabled/disabled corresponding to geolocation data.

11. An apparatus comprising:
a wireless communication device configured to receive an output signal corresponding to a vehicle system;
a processor configured to (i) analyze said output signal to determine vehicle information, (ii) associate a type of feedback with said vehicle information and (iii) generate a haptic signal; and
a feedback device configured to generate haptic feedback corresponding to said type of feedback in response to said haptic signal and one or more feedback settings stored on said device, wherein (a) said apparatus is worn by a user, (b) said haptic feedback supports information provided to a primary feedback device and said haptic feedback is generated after comparing said second output signal to feedback settings stored on said device.

12. The apparatus according to claim 11, wherein (i) said vehicle system is an Advanced Driver-Assistance System (ADAS) and (ii) said vehicle system generates a primary feedback signal for said primary feedback device and said output signal.

13. The apparatus according to claim 11, wherein said haptic feedback enables said vehicle information to be provided to said user without said user looking at said apparatus.

14. The apparatus according to claim 11, wherein said user is a driver of a vehicle.

15. The apparatus according to claim 14, wherein a passenger of said vehicle receives the same haptic feedback sent to said driver.

16. The apparatus according to claim 11, wherein said feedback settings stored on said device are customizable.

17. The apparatus according to claim 16, wherein (i) said wireless communication device is further configured to connect with a user device and (ii) said type of feedback associated with said vehicle information is customized using said user device.

18. The apparatus according to claim 11, wherein said type of feedback is independent from a vehicle.

19. The apparatus according to claim 11, further comprising a memory configured to store said associations of said type of feedback with said vehicle information.

20. The apparatus according to claim 11, wherein said comparison of said second output signal to said feedback settings stored on said device confirms said user intends to receive said haptic feedback.

\* \* \* \* \*